United States Patent [19]

Wessel et al.

[11] Patent Number: 5,391,603
[45] Date of Patent: Feb. 21, 1995

[54] IMPACT MODIFIED SYNDIOTACTIC VINYL AROMATIC POLYMERS

[75] Inventors: Thomas E. Wessel; Bruce P. Thill; Yi-Bin Huang, all of Midland, Mich.

[73] Assignee: The Dow Chemical Company, Midland, Mich.

[21] Appl. No.: 50,949

[22] Filed: Apr. 21, 1993

Related U.S. Application Data

[63] Continuation-in-part of Ser. No. 848,602, Mar. 9, 1992, abandoned.

[51] Int. Cl.$^6$ .......................... C08K 5/09; C08L 25/10
[52] U.S. Cl. ...................... 524/396; 525/68; 525/98; 524/399; 524/494
[58] Field of Search .............. 524/494, 399, 396; 526/346, 347.2; 525/68, 98

[56] References Cited

U.S. PATENT DOCUMENTS

| | | | |
|---|---|---|---|
| 4,506,056 | 3/1985 | Gaylord | 524/445 |
| 4,680,353 | 7/1987 | Ishihara et al. | |
| 4,771,096 | 9/1988 | Bussink et al. | 524/494 |
| 4,774,301 | 9/1988 | Campbell et al. | |
| 4,946,897 | 8/1990 | Albizzati et al. | 526/346 |
| 4,950,724 | 8/1990 | Malan | |
| 4,959,435 | 9/1990 | Seitz | |
| 4,978,730 | 3/1990 | Naezawa et al. | 524/445 |
| 5,034,441 | 7/1991 | Nakano et al. | 524/117 |
| 5,093,417 | 3/1992 | Sasaki et al. | 25/68 |
| 5,109,068 | 4/1992 | Yamasaki et al. | 525/68 |

FOREIGN PATENT DOCUMENTS

| | | |
|---|---|---|
| 291915 | 4/1988 | European Pat. Off. |
| 312976 | 1/1989 | European Pat. Off. |
| 318793 | 3/1989 | European Pat. Off. |
| 324398 | 9/1989 | European Pat. Off. |
| 62-257948 | 10/1987 | Japan |
| 62-257950 | 10/1987 | Japan |
| 135868 | 5/1989 | Japan |

*Primary Examiner*—Veronica P. Hoke

[57] ABSTRACT

A composition of matter comprising:
A) from 25 to 90 parts by weight of a syndiotactic, vinylaromatic thermoplastic resin,
B) from 1 to 50 parts by weight of a rubbery, impact absorbing domain forming polymer,
C) from 0.1 to 30 parts by weight of a nucleator for the syndiotactic, vinylaromatic thermoplastic resin,
D) from 0 to 90 parts by weight of an mineral, glass, ceramic, polymeric or carbon reinforcing agent, and
E) from 0 to 90 parts by weight of one or more polyarylene ethers or polar group modified polyarylene ethers.

18 Claims, No Drawings

IMPACT MODIFIED SYNDIOTACTIC VINYL AROMATIC POLYMERS

CROSS-REFERENCE TO RELATED APPLICATION

This is a continuation-in-part of application Ser. No. 07/848,602, filed Mar. 9, 1992, now abandoned.

BACKGROUND OF THE INVENTION

The present invention relates to syndiotactic vinylaromatic polymer compositions containing impact modifiers. More particularly the present invention relates to such compositions that are further modified to incorporate crystal modifiers and optionally reinforcing aids, and compatabilizers.

In Japanese Kokai 1-135868, published May 29, 1989, there are disclosed certain resin compositions containing (a) inorganic fillers and (b) polyphenylene ether type resins including maleic anhydride modified poly(2,6-dimethyl-1,4-phenylene)ether. The resins are useful for electrical parts.

SUMMARY OF THE INVENTION

According to the present invention there is provided a composition of matter comprising:
A) from 25 to 90 parts by weight of a syndiotactic, vinylaromatic thermoplastic resin,
B) from 1 to 50 parts by weight of a rubbery, impact absorbing domain forming polymer,
C) from 0.1 to 30 parts by weight of a nucleator for the syndiotactic, vinylaromatic thermoplastic resin,
D) from 0 to 60 parts by weight of a mineral, glass, ceramic, polymeric or carbon reinforcing agent, and
E) from 0 to 90 parts by weight of one or more polyarylene ethers or polar group modified polyarylene ethers.

DETAILED DESCRIPTION

Syndiotactic vinylaromatic polymers especially include syndiotactic polystyrene prepared by coordination polymerization of styrene monomer under conditions to provide a high degree of syndiotacticity. Most highly preferred are those polymers containing greater than 50 percent syndiotacticity at a racemic triad. Such polymers are known in the art having been previously disclosed in U.S. Pat. Nos. 4,680,353, 4,959,435, 4,950,724, 4,774,301, and elsewhere. Preferred compositions according to the invention comprise from 50 to 90 parts by weight syndiotactic vinylaromatic polymer.

Rubbery polymers include any elastomeric polymer, i.e., organic and inorganic polymers having Tg less than 25° C., preferably less than 0° C., and having the previously specified rubbery domain forming properties. Examples of the types of polymers from which the present rubbery polymers are selected include homopolymers and copolymers of conjugated dienes, especially butadiene, and hydrogenated derivatives thereof, e.g., polybutadiene, styrene/butadiene block copolymers, hydrogenated polybutadiene, etc.; polymers of α-olefins, such as styrene grafted polyolefins, ethylene/propylene copolymers, and terpolymers of ethylene, propylene and a comonomer such as hexadiene or ethylidenenorbornene; acrylate polymers, such as polybutylacrylate, polycyclohexylacrylate, etc. and grafted derivatives thereof such as polystyrene-, polymethylmethacrylate- or styrene/methyl methacrylate copolymer grafted acrylate polymers; and silicone polymers such as polysiloxanes. Preferred are high molecular weight styrene/butadiene/styrene triblock copolymers, especially hydrogenated derivatives thereof, also referred to as styrene/ethylene/butylene/styrene copolymers. Such polymers are conveniently prepared by anionic polymerization techniques using difunctional initiators, by coupling of living diblock polymers made by monofunctional initiators or by sequential polymerization. Such processes are previously disclosed in the art and well known to the skilled artisan.

The rubbery polymers are suitably chosen in order to impart impact absorbing properties to the polymer composition. It is believed, without wishing to be bound by such belief, that under the extreme temperatures required for compounding syndiotactic vinylaromatic polymers, ordinary rubbery polymers loose their structural integrity and do not form impact absorbing domains. Rather, the rubbery polymer becomes extended and drawn by the compounding forces into thin sections that are incapable of absorbing impact forces. This result is due to several factors including the viscosity properties of the rubbery polymer and the matrix polymer (i.e. the syndiotactic vinylaromatic polymer and optional polyphenylene ether) under the compounding conditions employed, the interfacial tension existing between the rubber phase and the matrix, and the extent of relaxation afforded the polymer melt. The first two factors are determined by the physical and chemical properties of the rubbery polymer and the matrix, whereas the latter factor is controllable by the conditions utilized in the compounding or molding operation.

Generally, it is desirable to provide a rubbery polymer having extremely high melt viscosity, i.e. very low melt flow. Such polymers having high melt viscosity are not drawn into extremely thin sections by the shear forces of the compounding process, and retain greater ability to reform discrete rubber particles upon discontinuance of shearing forces. Additionally, the molten rubbery polymer beneficially should retain sufficient elastic memory to reform droplets in the melt when shearing forces are absent. In satisfaction of this desirable property the melt viscosity of the rubber should be relatively high compared to that of the matrix resin. Most preferred rubbers have a melt flow rate, Condition G, from 0 to 0.5 g/10 min., especially a melt flow rate, Condition X (315° C., 5.0 Kg) from 0 to 0.5 g/10 min.

The second desirable characteristic of the present composition is that the compatibility of the rubbery polymer and the matrix polymer in the melt be selected so as to develop maximum interfacial tension between the molten phases consistent with the need for satisfactory adhesion between the solid phases to promote impact absorption. Increased interfacial tension in the melt promotes rubber droplet formation due to the driving force to reduce surface area of the rubber particles in contact with the matrix. This increased interfacial tension in the melt does not necessarily result in incompatible, solid polymer, phases that reduce impact strength in the molded part.

Finally, the operating conditions are preferably chosen to provide sufficient relaxation time in the melt so that the aforementioned rubber particle formation can occur. If the molten polymer containing undesirable thin strata of the impact modifier due to shearing forces is quenched relatively quickly from the melt, the necessary droplet formation cannot occur and the resulting molded part will be deficient in impact properties. This result can occur, for example, in a molding process using molds operating at too low a mold temperature.

Generally, higher molecular weight polymers possess increased melt viscosity. Accordingly, preferred rubbery polymers are those rubbers having Mw from 100,000 to 400,000, more preferable from 150,000 to 300,000 Daltons, and having Tg less than 25° C., more preferably less than 0° C. Weight average molecular weights recited herein are apparent values based on a polystyrene standard, derived from gel permeation chromatography data, and not corrected for hydrodynamic volume differences between polystyrene and other polymeric components. Low molecular weight rubbery polymers, i.e., polymers having molecular weight less than 100,000 Daltons, have been found to possess insufficient melt viscosity to achieve the desired rubber droplet formation. Preferred quantities of the rubbery polymer are from 2 to 30, most preferably 5 to 25 parts by weight. Also, hydrogenated styrene/butadiene/styrene triblock copolymers generally possess reduced melt flow rate compared to unhydrogenated polymers of the same molecular weight. Accordingly, hydrogenated styrene/butadiene/styrene triblock copolymers are preferred for use in the present invented blend.

Nucleators for use herein, are compounds capable of reducing the time required for onset of crystallization of the syndiotactic vinylaromatic polymer upon cooling from the melt. Nucleators provide a greater degree of crystallinity in a molding resin and more consistent levels of crystallinity under a variety of molding conditions. Higher levels of crystallinity are desired in order to achieve increased chemical resistance. In addition crystal morphology may be desirably altered. Examples of suitable nucleators for use herein are metal salts, especially aluminum salts of organic acids. Especially preferred compounds are aluminum salts of benzoic acid and $C_{1-10}$ alkyl substituted benzoic acid derivatives. A most highly preferred nucleator is aluminum tris(p-tert-butyl)benzoate. The amount of nucleator used should be sufficient to cause nucleation and the onset of crystallization in the syndiotactic vinylaromatic polymer in a reduced time compared to compositions lacking in such nucleator. Preferred amounts are from 0.5 to 5 parts by weight.

Surprisingly, in the present formulation it has now been discovered that the presence of both the specific impact absorbing domain forming rubber and the nucleator results in improved impact resistance as measured by Izod impact resistance. In the absence of a nucleator, a noticeable decrease in impact resistance is observed for the resin blends. In addition, distortion temperature under load, DTUL, is also increased by the presence of such a nucleator.

The reinforcing agent may be any mineral, glass, ceramic, polymeric or carbon reinforcing agent. Such material may be in the shape of fibers having a length to diameter ratio (L/D) of greater than 5, or in the shape of particulates having (L/D) less than 5. Preferred particle diameters are from 0.1 micrometers to 1 millimeter. Suitable reinforcing agents include mica, talc, glass microspheres, glass fibers, ceramic whiskers, carbon fiber strands, boron nitride fibers, aramide fibers, etc. Preferred reinforcing agents are glass fibers, glass roving or chopped glass fibers having lengths from 0.1 to 10 millimeters and L/D from 5 to 100. Two such suitable glass fibers are available from Owens Corning Fiberglas under the designation OCF 187A ™ or 497 ™. The amount of reinforcing agent employed is preferably from 10 to 50 parts by weight.

The reinforcing agent may include a sizing agent or similar coating which, among other functions, may promote adhesion between the reinforcing agent and the polar group functionalized polyarylene ethers. Suitable sizing agents may contain amine, aminosilane, epoxy, and aminophosphine functional coupling agents. Preferred are aminosilane coupling agents such as 3-aminopropyltrimethoxysilane.

Polyarylene ethers are a known class of polymer having been previously described in U.S. Pat. Nos. 3,306,874, 3,306,875, 3,257,357, and 3,257,358, the teachings of which are incorporated herein by reference. A preferred polyarylene ether is poly(2,6-dimethyl-1,4-phenylene)ether. The polyphenylene ethers are normally prepared by an oxidative coupling reaction of the corresponding bisphenol compound. Preferred polyarylene ethers are polar group functionalized polyarylene ethers, which are a known class of compounds prepared by contacting polar group containing reactants with polyarylene ethers. The reaction is normally conducted at an elevated temperature, preferably in a melt of the polyarylene ether, under conditions to obtain homogeneous incorporation of the functionalizing reagent. Suitable temperatures are from 150° C. to 300° C.

Suitable polar groups include the acid anhydrides, acid halides, acid amides, sulfones, oxazolines, epoxies, isocyanates, and amino groups. Preferred polar group containing reactants are compounds having up to 20 carbons containing reactive unsaturation, such as ethylenic or aliphatic ring unsaturation, along with the desired polar group functionality. Particularly preferred polar group containing reactants are dicarboxylic acid anhydrides, most preferably maleic anhydride. Typically the amount of polar group functionalizing reagent employed is from 0.01 percent to 20 percent, preferably from 0.5 to 15 percent, most preferably from 1 to 10 percent by weight based on the weight of polyarylene ether. The reaction may be conducted in the presence of a free radical generator such as an organic peroxide or hydroperoxide agent if desired. Preparation of polar group functionalized polyarylene ethers have been previously described in U.S. Pat. Nos. 3,375,228, 4,771,096 and 4,654,405, the teachings of which are incorporated herein by reference.

The polar group modified polyarylene ethers beneficially act as compatibilizers to improve adhesion between the reinforcing agent and the syndiotactic vinylaromatic polymer. Generally if less than 0.01 weight percent of the polar group containing reactant is employed in the preparation of the polar group modified polyphenylene ether, less than desired compatibility between the reinforcing agent and the syndiotactic vinylaromatic polymer resin is attained. If greater than 20 weight percent is employed, no significant advantage in polymer properties due to improved compatibility is realized. The amount of polyarylene ether employed in the present resin blend is beneficially from 0.1 to 50 parts by weight. For polar group modified polyarylene ethers used as a compatibilizer, the preferred quantity for use is from 0.1 to 10 parts by weight.

In one embodiment of the invention the polar group modified polyarylene ether may be in the form of a coating applied to the outer surface of the reinforcing agent to impart added compatibility between the reinforcing agent and the polymer matrix. The polar group modified polyarylene ether so utilized may be in addition to further amounts of polyarylene ether or polar group modified polyarylene ether also incorporated in the blend. The surface coating is suitably applied to the reinforcing agent by contacting the same with a solution or emulsion of the polar group functionalized polyarylene ether. Suitable solvents for dissolving the polar group functionalized polyarylene ether to form a solution or for use in preparing an emulsion of a water-in-oil or oil-in-water type include methylene chloride, trichloromethane, trichloroethylene, trichloroethane, etc. Preferably the concentration of polar group functionalized polyarylene ether in the solution or emulsion is from 0.1 weight percent to 20 weight percent, preferably 0.5 to 5 percent by weight. After coating of the reinforcing agent using either a solution or emulsion, the liquid vehicle is removed by evaporation, devolatilization, vacuum drying, etc. The resulting surface coating is desirably from 0.001 to 10 weight percent of the uncoated reinforcing agent weight. Use of the polar group modified polyarylene ether in this manner has been previously disclosed and claimed in copending U.S. patent application Ser. No. 660,461, filed Feb. 26, 1991 now abandoned, the teachings of which are hereby incorporated by reference.

The compositions of the present invention are prepared by combining the respective components under conditions to provide uniform dispersal of the ingredients. Alternatively, where a polar group modified polyarylene ether is used, this component of the blend may be prepared in situ by reacting the polar group reactant with the polyphenylene ether and further incorporating the molten product directly into the finished blend. Mechanical mixing devices such as extruders, ribbon blenders, solution blending or any other suitable device or technique may be utilized.

Additional additives such as blowing agents, extrusion aids, antioxidants, pigments, plasticizers, stabilizers, lubricants, etc. may also be included in the composition in amounts up to 10 percent, preferably up to 5 percent, by weight, based on final composition weight.

Desirably the resulting composition possesses an Izod impact resistance (ASTM D-256) of at least 2.5 ft lbs/in notch (130 J/M notch) and a DTUL (ASTM D-648 @ 264 psi (1.8 MPa) of at least 200° C.

Having described the invention the following example is provided as further illustrative and is not to be construed as limiting. Unless stated to the contrary parts and percentages are based on weight.

EXAMPLE 1

Blends of components identified in Table I were prepared by first dry mixing the respective components (excepting glass fibers) in a drum mixer. All blends additionally contained as antioxidant and thermal stabilizer 0.1% tetrakis(methylene(3,5-di-tertbutyl-4-hydroxyhydrocinnamate))methane (Irganox 1010) and 0.1% bis(2,4-di-tertbutylphenyl)pentaerythritol (Ultranox 626). The resulting mixture was passed through a 40 mm W-P compounding extruder at a controlled rate while adding chopped fiberglass. The resulting compounded blend was injection molded under standard conditions and tested according to ASTM test methods. Results are contained in Table I Identification of components:

(A) Syndiotactic polystyrene (SPS): Mw=400,000, Tg 95° C. and Tm 270° C. (available from The Dow Chemical Company as XU 72104.04).

(B) Rubber: Kraton G 1651, hydrogenated styrene/butadiene/styrene block copolymer, Mw=270,000, Mw/Mn=1.06., styrene content 32 percent, melt flow (Condition G), 0 g/10 min. Available from Shell Chemical.

(C) Nucleator: aluminum tris(p-tert-butylbenzoate), available from Shell Chemical.

(D) Glass fibers: 0.125" length×0.009" diameter (3 mm×0.2 mm diameter), coated with 3-aminopropyl-trimethoxysilane coupling agent. (Owens Corning Fiberglas 187A ™).

(E) Maleic anhydride modified polyphenylene oxide resin (MAPPO): 3 weight percent maleic anhydride prepared by injecting maleic anhydride at an appropriate rate to provide the desired maleic anhydride content into a 0.8" (2.0 cm) Welding Engineers Twin Screw extruder which is charged with poly(2,6-dimethyl-1,4-phenylene)ether and operated under conditions to melt plastify the resin. The resulting product is extruded and chopped into granules.

TABLE I

| Run | SPS (%) | Rubber (%) | MAPPO (%) | Fiberglass (%) | Nucleator | Impact[1] Strength | DTUL °C. |
|---|---|---|---|---|---|---|---|
| * | 67.2 | 0.0 | 1.8 | 30 | 1.0 | 1.7(91) | 249 |
| 1 | 59.4 | 9.0 | 1.8 | 30 | 0.6 | 2.6(139) | 224 |

*comparative
[1]notched Izod impact strength, ASTM D-256, ft.lbs/in notch (J/M notch)

EXAMPLE 2

The reaction conditions of Example 1 are substantially repeated excepting that the glass fibers used are precoated with a 4% solution of MAPPO in trichloroethylene and dried prior to compounding. Results are contained in Table II.

TABLE II

| Run | SPS (%) | Rubber (%) | MAPPO (%) | Fiberglass (%) | Nucleator | Impact[1] Strength | DTUL °C. |
|---|---|---|---|---|---|---|---|
| 2 | 59.4 | 10 | 0 | 30 | 0.6 | 2.7(144) | 240 |
| 3 | 57.6 | 10 | 1.8 | 30 | 0.6 | 3.0(160) | 216 |

[1]notched Izod impact strength, ASTM D-256, ft.lbs/in notch (J/M notch)

What is claimed is:

1. A composition of matter comprising:
   A) from 25 to 90 parts by weight of a syndiotactic, vinylaromatic thermoplastic resin,
   B) from 1 to 50 parts by weight of a rubbery, impact absorbing, domain forming hydrogenated styrene/conjugated diene block copolymer, having a melt flow rate, Condition X (315° C., 5.0 Kg) from 0 to 0.5 g/10 min,
   C) from 0.1 to 30 parts by weight of a nucleator for the syndiotactic, vinylaromatic thermoplastic resin,
   D) from 0 to 90 parts by weight of an mineral, glass, ceramic, polymeric or carbon reinforcing agent, and
   E) from 0 to 90 parts by weight of one or more polyarylene ethers or polar group modified polyarylene ethers.

2. A composition according to claim 1 wherein the reinforcing agent comprises glass fibers.

3. A composition according to claim 1 wherein the reinforcing agent additionally comprises a sizing composition on the surface thereof.

4. A composition according to claim 3 comprising from 10 to 50 parts by weight reinforcing agent.

5. A composition according to claim 1 or 4 comprising a polar group modified polyarylene ether.

6. A composition according to claim 5 wherein the polar group modified polyarylene ether is a maleic anhydride modified polyarylene ether.

7. A composition according to claim 6 wherein the maleic anhydride modified polyarylene ether is produced by melting a polyarylene ether, contacting from 0.5 to 15 weight percent maleic anhydride with the molten polyarylene ether, and recovering the resulting product.

8. A composition according to claim 5 comprising from 0.1 to 5 parts by weight maleic anhydride modified polyarylene ether.

9. A composition according to claim 4 wherein the reinforcing agent is coated with a surface coating comprising a dicarboxylic acid anhydride modified polyarylene ether.

10. A composition according to claim 1 wherein the syndiotactic vinylaromatic polymer is syndiotactic polystyrene containing greater than 50 percent syndiotacticity at a racemic triad.

11. A composition according to claim 1 wherein the rubbery polymer is a styrene/butadiene/hydrogenated styrene triblock copolymer.

12. A composition according to claim 11 wherein the rubbery polymer has a molecular weight from, 100,000 to 400,000 Daltons.

13. A composition according to claim 1, 11 or 12 comprising from 5 to 25 parts of the rubbery polymer.

14. A composition according to claim 1, 4, 11 or 12 wherein the nucleator is a metal salt.

15. A composition according to claim 14 wherein the nucleator is an aluminum salt.

16. A composition according to claim 15 wherein the nucleator is aluminum tris(p-tert-butylbenzoate).

17. A composition according to claim 5 wherein the nucleator is aluminum tris(p-tert-butylbenzoate).

18. A composition according to claim 13 wherein from 0.5 to 5.0 parts by weight of the nucleator are present.

* * * * *

UNITED STATES PATENT AND TRADEMARK OFFICE
CERTIFICATE OF CORRECTION

PATENT NO. : 5,391,603

DATED : February 21, 1995

INVENTOR(S) : Thomas E. Wessel, et al.

It is certified that error appears in the above-identified patent and that said Letters Patent is hereby corrected as shown below:

Column 8, Claim 11, lines 6-7, "styrene/butadiene/hydrogenated styrene" should correctly read --hydrogenated styrene/butadiene/styrene--.

Signed and Sealed this

Fourth Day of June, 1996

Attest:

BRUCE LEHMAN

Attesting Officer

Commissioner of Patents and Trademarks